United States Patent [19]
Itoh et al.

[11] Patent Number: 4,609,490
[45] Date of Patent: Sep. 2, 1986

[54] PREPARATION OF DEFOAMING AGENT FOR THE MANUFACTURE OF BEAN CURD

[75] Inventors: Masumi Itoh, Ibaraki; Seishi Takenawa, Nara, both of Japan

[73] Assignee: Fujisawa Pharmaceutical Co., Ltd., Osaka, Japan

[21] Appl. No.: 637,828

[22] Filed: Aug. 6, 1984

[30] Foreign Application Priority Data

Aug. 16, 1983 [JP] Japan .................. 58-149967

[51] Int. Cl.$^4$ .................. B01D 19/04; C09K 3/00
[52] U.S. Cl. .................. 252/358; 252/321; 426/508
[58] Field of Search .................. 252/321, 356, 358; 260/410.7

[56] References Cited

U.S. PATENT DOCUMENTS

| | | | |
|---|---|---|---|
| 2,550,450 | 4/1951 | Brown et al. | 252/321 X |
| 2,923,687 | 2/1960 | Jursich | 252/321 |
| 3,100,151 | 8/1963 | Breivik et al. | 252/358 UX |
| 3,514,297 | 5/1970 | Campbell, Jr. et al. | 260/410.7 |
| 3,661,795 | 5/1972 | Pardun | 252/356 |
| 3,677,963 | 7/1972 | Lichtman et al. | 252/321 X |
| 3,993,580 | 11/1976 | Galusky | 252/356 X |

FOREIGN PATENT DOCUMENTS 20787 2/1976 Japan .
34051 3/1980 Japan .

Primary Examiner—Richard D. Lovering
Attorney, Agent, or Firm—Oblon, Fisher, Spivak, McClelland & Maier

[57] ABSTRACT

A process for preparing a defoaming agent for the manufacture of bean curd which comprises blending glycerol fatty acid esters containing not less than ca. 90% of glycerol fatty acid monoester(s) with additives, then melting the resulting mixture, then granulating the resultant, and then selecting the granules, the size of which is not less than 300 μm by sieving.

1 Claim, No Drawings

PREPARATION OF DEFOAMING AGENT FOR THE MANUFACTURE OF BEAN CURD

This invention relates to a novel defoaming agent for the manufacture of bean curd which comprises glycerol fatty acid ester(s) containing no less than about 90% of glycerol fatty acid monoester(s), wherein the grain size of the defoaming agent is not less than 300 μm.

There has so far been known a defoaming agent for the manufacture of bean curd which is mainly composed of glycerol fatty acid ester(s) [mixture of glycerol fatty acid monoester(s), glycerol fatty acid diester(s) and glycerol fatty acid triester(s)]. Such known defoaming agent which is mainly composed of glycerol fatty acid esters displays excellent defoaming activity in the step of boiling go (go is a juice which is prepared by grinding water-swollen soybean with water) during the bean curd manufacturing process. However, the known defoaming agent exhibits only insufficient defoaming activity in soybean milk which is obtained by filtration of go, so that soybean milk, when allowed to coagulate to give bean curd, coagulates with air bubbles contained therein. The known defoaming agent thus has a drawback in that it cannot afford bean curd of good quality.

The present inventors conducted an intensive study to find out a defoaming agent capable of affording bean curd of good quality and found that a very excellent defoaming effect can be produced in soybean milk and therefore bean curd of very good quality can be obtained when the prior art defoaming agent mainly composed of glycerol fatty acid ester(s) is modified in a manner such that the content of glycerol fatty acid monoester(s) in the glycerol fatty acid ester(s) amounts to not less than about 90% and the grain size is not less than 300 μm. The present invention has been completed on the basis of this surprising finding.

The glycerol fatty acid ester(s) in which the content of glycerol fatty acid monoester(s) is not less than about 90% and which is therefore suited for use as the principal component of the defoaming agent for the manufacture of bean curd according to the invention includes, among others, those ester(s) which are derived from saturated or unsaturated fatty acid(s) (preferably containing 10–30 carbon atoms), such as palmitic acid, stearic acid and oleic acid, and glycerol and in which the glycerol fatty acid monoester content is not less than about 90%, and those products which are obtained by reacting animal fats (e.g. beef tallow), fish oils or vegetable oils (e.g. soybean oil, rapeseed oil, safflower oil), following hardening as necessary, with glycerol, followed by purification in the conventional manner (e.g. by distillation) until the glycerol fatty acid monoester content in the esterification products amounts to not less than about 90%. Particularly preferred embodiment is the one obtained by reacting extremely hardened beef tallow with glycerol, followed by distillation and which contains a glycerol fatty acid monoester(s) not less than about 90%.

The defoaming agent for the manufacture of bean curd according to the invention may contain, in addition to the above principal component, a silicone which itself has defoaming activity, an inorganic substance which itself has weak defoaming activity and can serve as a carrier for the principal component of the defoaming agent according to the invention, such as calcium carbonate, magnesium carbonate or tricalcium phosphate, and/or soya lecithin or the like which itself has weak defoaming activity.

The preferred level of addition of the above-mentioned silicone is 0.1–2%, the preferred level of addition of the inorganic substance is 1–70%, more preferably 20–60%, and the preferred level of addition of soya lecithin is 1–30%, more preferably 2–10%.

The defoaming agent according to the invention may further contain substances which may be used in the ordinary process of the manufacture of bean curd and will not adversely affect the defoaming activity, such as binding agents (e.g. carrageenan, sodium alginate, gum arabic, gum guaiac, starch), colorants, amino acids (sodium glutamate, lysine, methionine), inorganic salts (e.g. sodium chloride, potassium chloride), and organic acid salts (e.g. sodium gluconate, calcium lactate, sodium citrate).

The defoaming agent according to the invention can be prepared by weighing necessary components and subjecting them to the steps of blending, melting and granulation. In the granulation step following the melting step, the melt may be granulated by the method comprising cooling for solidification followed by crushing, by the extrusion method, or by the spray chilling method. After granulation, those granules which have a grain size of not less than 300 μm may be fractionated by sieving or other appropriate means, as necessary. Those granules which are smaller in diameter than 300 μm may be again subjected to granulation for preparing the defoaming agent according to the invention. When, after granulation, the content of granules smaller in size than 300 μm is tolerably small, the whole may be used as it is, namely in a somewhat diluted form, without sieving, depending on the cost balance between said content and sieving.

The grain size of the defoaming agent according to the invention is required only to be not less than 300 μm but preferably is 400–3000 μm.

The following test example is further illustrative of the invention.

TEST EXAMPLE

Raw soybean (5.85 kg) was immersed in water overnight. Then, following addition of 25 liters of water, go was prepared by grinding. Thereto was added 45 g of the defoaming agent described herein in any of the examples. The mixture was heated to 110° C. in a tightly closed pressure cooker with steam passed therethrough. Directly after attainment of the temperature of 110° C., the mixture was fractionated into soybean milk and okara (bean curd refuse) in an automatic rotary press. The effluent soybean milk was almost foam-free immediately from the start of outflow. When the defoaming agent described herein in any of the examples was further sieved and the fraction having a grain size of not less than 590 μm was selectedly submitted to the same test as above, the use of the defoaming agent in a halved amount (22.5 g) also gave almost foam-free effluent milk directly from the start of outflow.

On the other hand, the fractions smaller in grain size than 300 μm as obtained by sieving in the examples described later herein were also tested in the above manner. Furthermore, defoaming agents in which the glycerol fatty acid monoester content in the total glycerol fatty acid esters is 45%, 60% and 75%, respectively, were prepared by replacing the glycerol fatty acid ester products used in the examples in accordance with the invention with corresponding ester products, and tested in the same manner as above. With any of these defoaming agents, a very large amount of foam was observed immediately from the start of outflow at the addition level of 45 g. Even after treatment by vibration following 7 minutes of standing, there was still found a very large quantity of foam.

The following formulation examples of the defoaming agent for the manufacture of bean curd are further illustrative of the invention.

EXAMPLE 1

| | |
|---|---|
| Extremely hardened beef tallow glycerol esters obtained by reaction of extremely hardened beef tallow with glycerol followed by distillation and having a glycerol fatty acid monoester content of 98.0% | 53% |
| Silicone | 0.8% |
| Soya lecithin | 6.2% |
| Calcium carbonate | 40% |

The above ingredients were mixed, melted and granulated by the spray chilling method, and the granules were sieved. The fraction consisting of granules of the size of not less than 300 μm was selected and submitted for use as a defoaming agent in the manufacture of bean curd.

EXAMPLE 2

| | |
|---|---|
| Extremely hardened beef tallow glycerol esters obtained by reaction of extremely hardened beef tallow with glycerol followed by distillation and having a glycerol fatty acid monoester content of 93% | 33% |
| Silicone | 0.8% |
| Soya lecithin | 6.2% |
| Calcium carbonate | 30% |
| Starch | 30% |

The above ingredients were mixed, melted and granulated by the spray chilling method, and the granules were sieved. The fraction consisting of granules of the size of not less than 300 μm was selected and submitted for use as a defoaming agent in the manufacture of bean curd.

EXAMPLE 3

| | |
|---|---|
| Extremely hardened beef tallow glycerol esters obtained by reaction of extremely hardened beef tallow with glycerol followed by distillation and having a glycerol fatty acid monoester content of 90% | 90% |
| Silicone | 0.8% |
| Soya lecithin | 6.2% |
| Calcium carbonate | 3% |

The above ingredients were mixed, melted and granulated by the spray chilling method, and the granules were sieved. The fraction consisting of granules of the size of not less than 300 μm was selected and submitted for use as a defoaming agent in the manufacture of bean curd.

EXAMPLE 4

| | |
|---|---|
| Extremely hardened beef tallow glycerol esters obtained by reaction of extremely hardened beef tallow with glycerol followed by distillation and having a glycerol fatty acid monoester content of 98% | 54% |
| Soya lecithin | 6% |
| Calcium carbonate | 40% |

The above ingredients were mixed, melted and granulated by the spray chilling method, and the granules were sieved. The fraction consisting of granules of the size of not less than 300 μm was selected and submitted for use as a defoaming agent in the manufacture of bean curd.

EXAMPLE 5

| | |
|---|---|
| Extremely hardened beef tallow glycerol esters obtained by reaction of extremely hardened beef tallow with glycerol followed by distillation and having a glycerol fatty acid monoester content of 98% | 57% |
| Silicone | 0.8% |
| Soya lecithin | 2.2% |
| tricalcium phosphate | 40% |

The above ingredients were mixed, melted and granulated by the extrusion method, and the granules were sieved. The fraction consisting of granules of the size of not less than 300 μm was selected and submitted for use as a defoaming agent in the manufacture of bean curd.

EXAMPLE 6

| | |
|---|---|
| Extremely hardened beef tallow glycerol esters obtained by reaction of extremely hardened beef tallow with glycerol followed by distillation and having a glycerol fatty acid monoester content of 98% | 75% |
| Silicone | 0.4% |
| Soya lecithin | 4.6% |
| Magnesium carbonate | 20% |

The above ingredients were mixed, melted and granulated by the spray chilling method, and the granules were sieved. The fraction consisting of granules of the size of not less than 300 μm was selected and submitted for use as a defoaming agent in the manufacture of bean curd.

EXAMPLE 7

| | |
|---|---|
| Extremely hardened beef tallow glycerol esters obtained by reaction of extremely hardened beef tallow with glycerol followed by distillation and having a glycerol fatty acid monoester content of 96.9% | 73% |
| Silicone | 0.8% |
| Soya lecithin | 6.2% |
| Calcium carbonate | 20% |

The above ingredients were mixed, melted and granulated by the spray chilling method, and the granules were sieved. The fraction consisting of granules of the size of not less than 300 μm was selected and submitted for use as a defoaming agent in the manufacture of bean curd.

EXAMPLE 8

| | |
|---|---|
| Extremely hardened beef tallow glycerol esters obtained by reaction of extremely hardened beef tallow with glycerol followed by distillation and having a glycerol fatty acid monoester content of 93% | 92.5% |
| Silicone | 0.5% |
| Soya lecithin | 4.5% |
| Calcium carbonate | 2.5% |

The above ingredients were mixed, melted and granulated by the spray chilling method, and the granules were sieved. The fraction consisting of granules of the size of not less than 300 μm was selected and submitted for use as a defoaming agent in the manufacture of bean curd.

EXAMPLE 9

| | |
|---|---|
| Hardened soybean oil glycerol esters obtained by reaction of hardened soybean oil with glycerol followed by distillation and having a glycerol fatty acid monoester content of 98% | 53% |
| Silicone | 0.8% |
| Soya lecithin | 6.2% |
| Calcium carbonate | 40% |

The above ingredients were mixed, melted and granulated by the spray chilling method, and the granules were sieved. The fraction consisting of granules of the size of not less than 300 μm was selected and submitted for use as a defoaming agent in the manufacture of bean curd.

What we claim is:

1. A process for preparing a defoaming agent for the manufacture of bean curd which comprises blending glycerol fatty acid ester(s) containing not less than about 90% of glycerol fatty acid monoester(s) with additive(s) and then melting the resulting mixture and then granulating the resultant and then selecting the granules, the size of which is not less than 300 μm by sieving.

* * * * *